United States Patent

Nakayama et al.

[11] Patent Number: 5,103,953
[45] Date of Patent: Apr. 14, 1992

[54] HYDRAULIC CLUTCH CONSTRUCTION

[75] Inventors: Hiroshi Nakayama; Shigeo Ozawa, both of Saitama; Yasuyuki Suzuki, Shizuoka, all of Japan

[73] Assignee: Honda Giken Kogyo Kabushiki Kaisha, Tokyo, Japan

[21] Appl. No.: 566,308

[22] Filed: Aug. 10, 1990

Related U.S. Application Data

[63] Continuation of Ser. No. 330,133, Mar. 29, 1989, abandoned.

[51] Int. Cl.⁵ .................... F16D 25/638; F16D 13/54
[52] U.S. Cl. ............... 192/85 AA; 192/89 B; 192/99 A; 267/161
[58] Field of Search ............ 192/85 A, 85 AA, 89 B, 192/99 R; 267/158, 161, 162

[56] References Cited

U.S. PATENT DOCUMENTS

| | | | |
|---|---|---|---|
| 2,806,568 | 9/1957 | Bliss | 192/89 B XR |
| 2,876,743 | 3/1959 | Maki | 192/87 AA XR |
| 2,880,835 | 4/1959 | Hass | 192/99 A |
| 3,013,792 | 12/1961 | Steinlein | 267/161 |
| 3,107,766 | 10/1963 | Pritchard | 192/89 B |
| 3,237,739 | 3/1966 | Pritchard | 192/89 B |
| 3,266,608 | 8/1966 | Lemieux | 192/89 B |
| 4,131,185 | 12/1978 | Schall | 192/89 B XR |
| 4,623,055 | 11/1986 | Ohkubo | 192/85 AA |

FOREIGN PATENT DOCUMENTS

| | | |
|---|---|---|
| 1455884 | 6/1969 | Fed. Rep. of Germany . |
| 3024196 | 1/1982 | Fed. Rep. of Germany . |
| 3321822 | 12/1984 | Fed. Rep. of Germany . |
| 829074 | 6/1938 | France . |
| 56-164228 | 12/1981 | Japan ..................... 192/85 AA |
| 2142403 | 1/1985 | United Kingdom . |

Primary Examiner—Richard Lorence
Attorney, Agent, or Firm—Lyon & Lyon

[57] ABSTRACT

A hydraulic clutch (40) for u se in an automotive automatic transmission includes a clutch drum (41) having a hydraulic pressure chamber (43), a piston (42) movably fitted in the clutch drum (41) in covering relation to the hydraulic pressure chamber (43), a pressure plate (45) disposed in confronting relation to a surface of the piston (42) remotely from the hydraulic pressure chamber (43), and interleaved drive and driven plates (46, 47) disposed in confronting relation to a surface of the pressure plate (45) remotely from the piston (42). The drive and driven plates (46, 47) are engageable with each other by the pressure plate (45) pressed by the piston (42) moved in response to a hydraulic pressure supplied to the hydraulic pressure chamber (43). An assisting member (44) is disposed between the piston (42) and the pressure plate (45) and comprises an annular array of rigid assisting levers (44a) and a retaining plate (44b) holding the assisting levers (44a) together. The assisting member (44) has a radially inner end pressable by the piston (42), a radially outer end held in engagement with the clutch drum (41), and a radially intermediate region engageable with a projection (45a) of the pressure plate (45). The assisting lever serves (44a) as a lever with the radially outer end as a fulcrum for boosting the force applied from the piston (42) and transmitting the boosted force to the pressure plate (45).

5 Claims, 3 Drawing Sheets

HYDRAULIC CLUTCH CONSTRUCTION

BACKGROUND OF THE INVENTION

This application is a continuation, of application Ser. No. 330,133, filed Mar. 29, 1989 now abandoned.

The present invention relates to a hydraulically operated clutch construction for use in an automatic transmission or the like.

Hydraulic clutches have been used in automotive automatic transmissions. Such a hydraulic clutch comprises a clutch drum having a hydraulic pressure chamber, a piston movably fitted in the clutch drum in covering relation to the hydraulic pressure chamber, and a pressure plate, a drive plate, and a driven plate which are successively disposed in confronting relation to a surface of the piston remote from its surface facing the hydraulic pressure chamber. When the hydraulic pressure chamber is supplied with a hydraulic pressure, the piston is moved to push the pressure plate to press the drive and driven plates into engagement with each other.

In view of recent demands for smaller and lighter automatic transmissions and hence for smaller and lighter hydraulic clutches, it has been attempted to increase the hydraulic pressure supplied to the hydraulic pressure chamber to exert a larger force to push the piston. This attempt is however problematic in that the power loss of a pump for supplying the hydraulic pressure is increased and the cost becomes higher since the sealing ability and the pressure resistance have to be increased.

Another proposed hydraulic clutch includes a diaphragm spring disposed between the piston and the pressure plate, the diaphragm spring having a radially inner end pressable by the piston and a radially outer end held against the clutch drum. The pressure plate has a projection held in abutment against the diaphragm spring between the radially inner and outer ends thereof. The diaphragm spring is caused to act as a lever with the radially outer end serving as its fulcrum. The force applied by the piston is boosted by the lever through the projections and transmitted to the pressure plate. A hydraulic clutch of this construction is disclosed in Japanese Laid-Open Patent Publication No. 56-164228, for example. The piston has a boost release projection corresponding to the projection on the pressure plate. When the piston is moved a distance greater than a predetermined stroke, the boost release projections are brought into engagement with the diaphragm spring to release the diaphragm spring from the boosting action, thereby preventing a high load from being applied to the diaphragm spring.

Since the diaphragm which serves as a lever is subject to a high load and a high stress, it can be used only in a limited pressure range in view of the available mechanical strength and durability of the diaphragm spring. Particularly where the hydraulic clutch is small in size and the diaphragm spring is small in diameter, with a resultant higher hydraulic pressure for a desired clutch capability, no sufficient mechanical strength and durability can be given to the diaphragm spring. For transmitting the force of the spring via the diaphragm spring to the pressure plate, the stroke of the piston must allow for the flexing of the diaphragm spring. Inasmuch as the piston stroke is increased, an extra axial space is needed in the clutch to accommodate the piston stroke.

With the piston having the boost release projection, the load on the diaphragm spring is prevented from being excessively high. However, the boosting ability of the diaphragm spring is available only until the boost release projection engages the diaphragm spring. Consequently, the maximum capacity of the hydraulic clutch remains the same as would if there were no diaphragm spring in the clutch.

SUMMARY OF THE INVENTION

It is an object of the present invention to provide a hydraulic clutch construction which can apply a boosted force from a piston to a pressure plate without employing any diaphragm spring which would suffer durability and mechanical strength problems.

A hydraulic clutch construction according to the present invention includes an assisting member disposed between a piston and a pressure plate and comprising an annular array of rigid assisting levers and a retaining plate holding the assisting levers together, the assisting member having a radially inner end pressable by the piston in response to a hydraulic pressure supplied to a hydraulic pressure chamber in a clutch drum, a radially outer end held in engagement with the clutch drum, and a radially intermediate region engageable with a projection of the pressure plate. The force applied from the piston is transmitted through the assisting member to the pressure plate.

When the hydraulic pressure is supplied to the hydraulic pressure chamber, the piston is moved to press the radially inner end of the assisting member toward the pressure plate. At this time, the assisting member serves as a lever with its fulcrum at the radially outer end engaging the clutch drum. The radially inner end of the assisting member which is engaged by the piston serves to receive the force from the piston, and the radially intermediate region of the assisting member serves to apply the force to the projection of the pressure plate. The force from the piston is thus boosted by the assisting member as the lever and then transmitted to the pressure plate.

Further scope of the applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
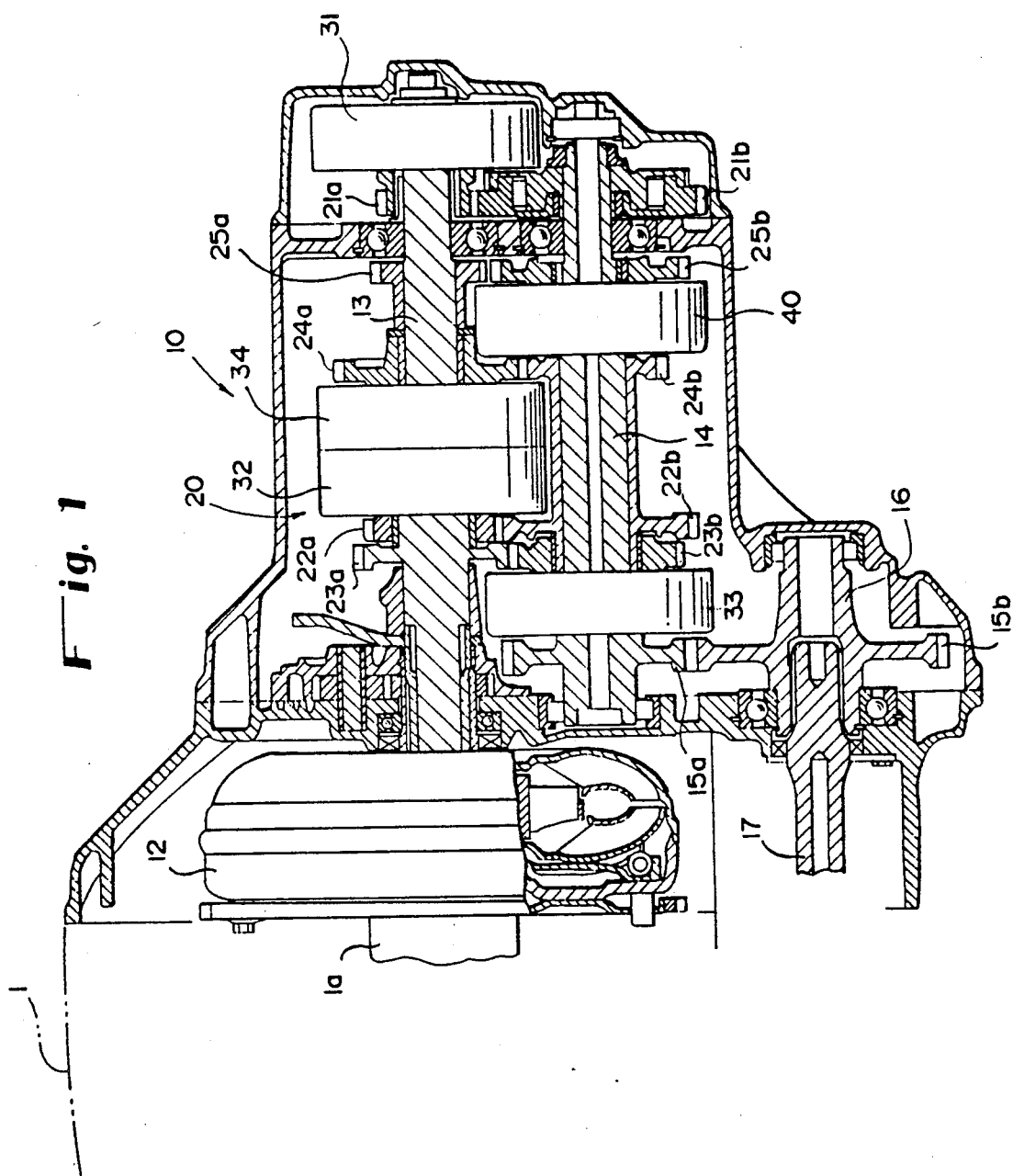
FIG. 1 is a fragmentary cross-sectional view of an automatic transmission incorporating a hydraulic clutch according to the present invention.

FIG. 1 shows an automotive automatic transmission having hydraulic clutches according to the present invention. The transmission, generally designated by the reference numeral 10, is positioned at the output end of an output shaft 1a of an engine 1 to which a torque converter 12 is coupled. The torque converter 12 has an output shaft connected to an input shaft 13 of the transmission 10 for transmitting output power from the engine 1 through the torque converter 12 to the transmission input shaft 13.

The transmission 10 includes a countershaft 14 extending parallel to the input shaft 13, and a transmission mechanism 20 disposed between the input shaft 13 and the countershaft 14. The transmission mechanism 20 has a drive assembly disposed on the countershaft 13 and a driven assembly disposed on the countershaft 14, and includes intermeshing gears 21a, 21b for a first-speed gear position, intermeshing gears 22a, 22b for a second-speed gear position, intermeshing gears 23a, 23b for a third-speed gear position, intermeshing gears 24a, 24b for a fourth-speed gear position, and intermeshing gears 25a, 25b for a reverse gear position. The reverse gear 25a and the reverse gear 25b both mesh with a reverse idler gear (not shown) for reversing the direction of rotation. The first-speed drive gear 21a, the second-speed drive gear 22a, the third-speed driven gear 23b, the fourth-speed drive gear 24a, and the reverse driven gear 25b may be rotatably mounted on the input shaft 13 or the countershaft 14, and the other gears may be fixedly mounted on the input shaft 13 or the countershaft 14.

The gears rotatably mounted on the shaft are associated respectively with hydraulic clutches 31, 32, 33, 34, and 40. By selectively engaging these five hydraulic clutches, one of the rotatably mounted gears is coupled to the shaft on which it is mounted to transmit engine output power through that associated gear and the gear meshing therewith.

With the hydraulic clutches 31 through 34 selectively engaged, the engine output power is changed in speed by the gear train associated with the engaged hydraulic clutch and then transmitted to the countershaft 14. An output drive gear 15a fixed to the countershaft 14 is held in mesh with an output driven gear 15b fixed to an output shaft 16 of the transmission 10. Therefore, the engine output power transmitted to the countershaft 14 is transmitted through the gears 15a, 15b to the output shaft 16, from which it is transmitted through a drive shaft 17 to a differential (not shown).

The hydraulic clutch 40 associated with the reverse gears is of a construction according to the present invention. The hydraulic clutch 40 and the hydraulic clutch 34 associated with the fourth-speed gears will be described with reference to FIG. 2.

Figure 2:
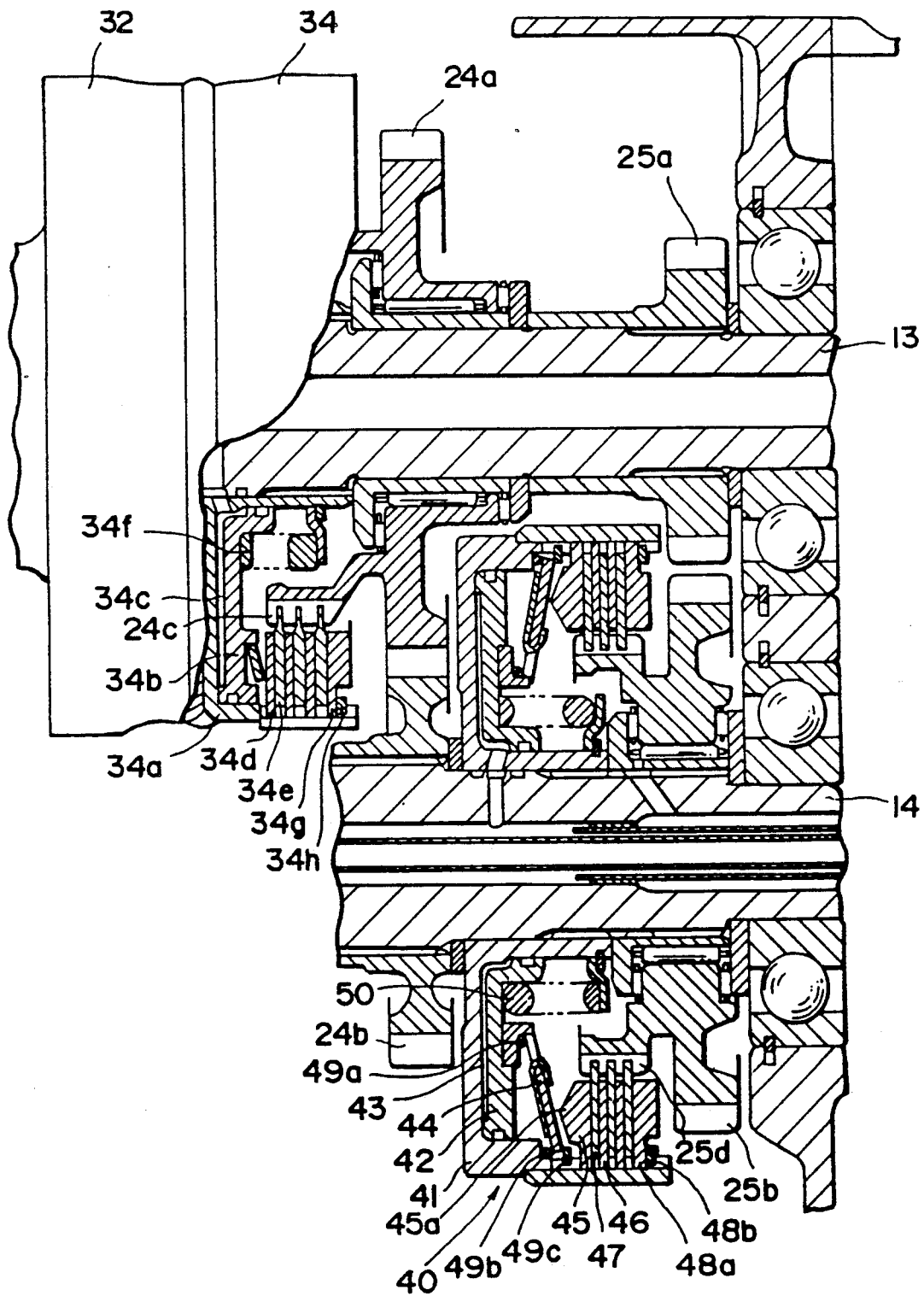
FIG. 2 is an enlarged cross-sectional view of the hydraulic clutch of the present invention.

In FIG. 2, the hydraulic clutch 34 mounted on the input shaft 13 in back-to-back relation to the hydraulic clutch 32 associated with the second-speed gears is fragmentarily shown in cross section, and the hydraulic clutch 40 mounted on the countershaft 14 is fragmentarily shown in cross section.

The hydraulic clutch 34 which is of a conventional structure will first be described briefly below. The hydraulic clutch 34 has a clutch drum 34a joined back-to-back to the clutch drum of the hydraulic clutch 32 and fixedly mounted on the input shaft 13, and a piston 34b axially movably fitted in the clutch drum 34a in covering relation to a hydraulic pressure chamber 34c defined in the clutch drum 34a. The piston 34b is normally urged at its radially inner end to move into the hydraulic pressure chamber 34c (i.e., to the left) under the bias of a return spring 34f. When the hydraulic pressure in the hydraulic pressure chamber 34c is low, the piston 34b is moved to the left as shown under the resiliency of the return spring 34f.

The piston 34b has a radially outer end confronting a plurality of interleaved clutch plates 34d and clutch discs 34e. The clutch plates 34d engage the clutch drum 34a, whereas the clutch discs 34e engage clutch splines 24c integral with the fourth-speed drive gear 24a. The clutch plates 34d and the clutch discs 34e are retained in the clutch drum 34a by an end plate 34g and a snap ring 34h.

When a certain hydraulic pressure is supplied into the hydraulic pressure chamber 34c to move the piston 34b to the right against the bias of the return spring 34f, the piston 34b presses the clutch plates 34d and the clutch discs 34e against the end plate 34g. The clutch plates 34d and the clutch discs 34e are now held in engagement with each other by frictional forces produced therebetween. The fourth-speed drive gear 24a is now rotated with the input shaft 13 to transmit the engine output power through the fourth-speed gears 24a, 24b. At this time, the clutch plates 34a serve as drive plates, and the clutch discs 34e as driven plates.

The hydraulic clutch 40 of the invention will now be described below. The hydraulic clutch 40 has a clutch drum 41 fixedly mounted on the countershaft 14 and a piston 42 axially movably fitted in the clutch drum 41 in covering relation to a hydraulic pressure chamber 43 defined in the clutch drum 41. The piston 42 is normally urged at its radially inner end to move into the hydraulic pressure chamber 43 (i.e., to the left) under the bias of a return spring 50. When the hydraulic pressure in the hydraulic pressure chamber 43 is low, the piston 42 is moved to the left as shown under the resiliency of the return spring 50.

The hydraulic clutch 40 has a plurality of interleaved clutch plates 46 and clutch discs 47 which are retained in the clutch drum 41 by an end plate 48a and a snap ring 48b. The clutch plates 46 engage the clutch drum 41, while the clutch discs 47 engage clutch splines 25d integral with the reverse driven gear 25b. A pressure plate 45 is disposed on a piston side of the leftmost clutch disc 47 which is closest to the piston 42, with a slightly conical disc-shaped assisting member 44 interposed between the pressure plate 45 and the piston 42.

Figure 3A:
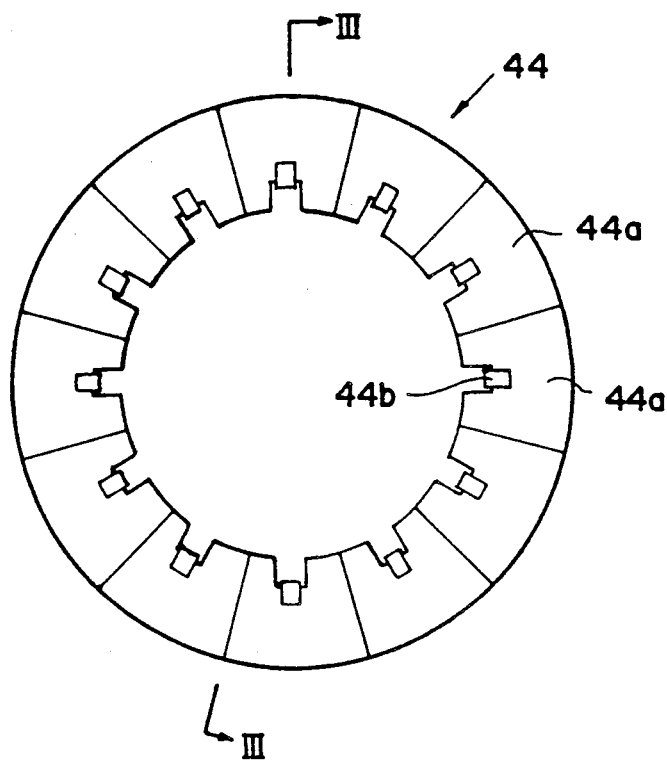
FIG. 3A is a front elevational view of an assisting member used in the hydraulic clutch.
Figure 3B:
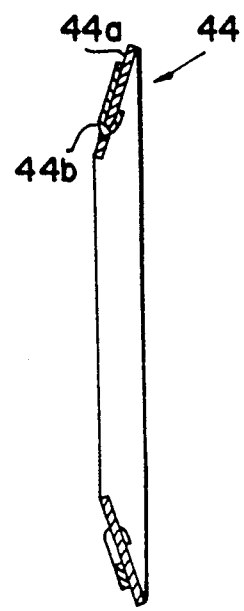
FIG. 3B is a cross-sectional view of the assisting member taken along line III—III of FIG. 3A.
Figure 4A:
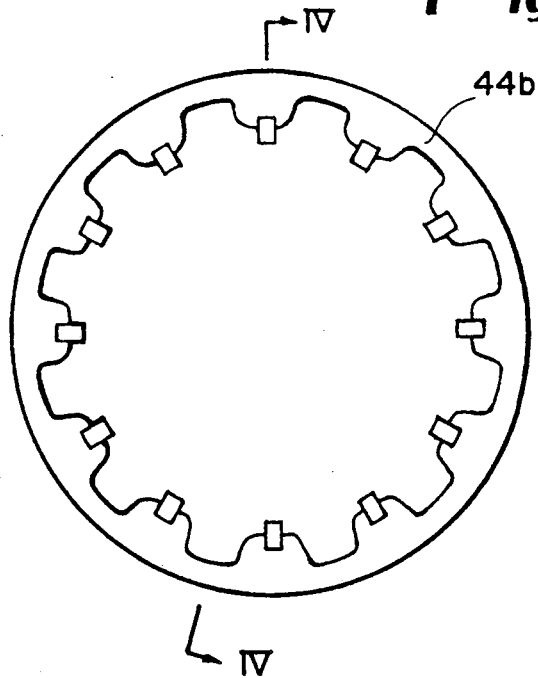
FIG. 4A is a front elevational view of a retaining plate of the assisting member.
Figure 4B:
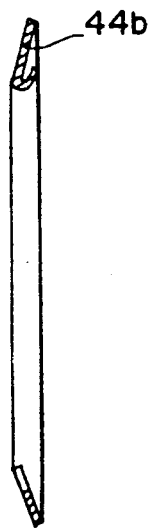
FIG. 4B is a cross-sectional view of the retaining plate taken along line IV—IV of FIG. 4A.

The assisting member 44 is illustrated in detail in FIGS. 3A and 3B. As shown in FIGS. 3A and 3B, the assisting member 44 comprises a slightly conical, annular array of assisting levers 44a (twelve in the illustrated embodiment) which are held together by a retaining plate 44b shown in FIGS. 4A and 4B.

With the assisting member 44 assembled in the hydraulic clutch 40, the radially inner ends of the assisting levers 44a abut against the piston 42 through a support ring 49a, and the radially outer ends of the assisting levers 44a are sandwiched between a support ring 49b and a snap ring 49c.

The pressure plate 45 has a projection 45a projecting axially toward the assisting member 44 and engageable with the assisting member 44 at a position radially intermediate between its radially inner and outer ends.

When the hydraulic pressure chamber 43 is supplied with a certain hydraulic pressure, the piston 42 is moved to the right against the bias of the return spring 50 to cause the support ring 49a to push the radially inner end of the assisting lever 44a to the right. The assisting lever 44a is now turned about its radially outer end until its radially intermediate region engages the projection 45a of the pressure plate 45 to push the pressure plate 45 to the right. The assisting lever 44a thus serves as a lever with the radially outer end as the fulcrum, the radially inner end receiving the applied moment, and the intermediate region applying the force to the projection 45a. The force from the piston 42 is boosted by the lever action of the assisting lever 44a and transmitted to the pressure plate 45.

When the pressure plate 45 is pushed to the right by the boosted force, the clutch plates 46 and the clutch discs 47 are sandwiched between the pressure plate 45 and the end plate 48a. The clutch plates 46 and the clutch discs 47 are thus held in engagement with each other under frictional forces produced therebetween. The reverse driven gear 45b is now coupled to the countershaft 14 for co-rotation, so that the engine output power can be transmitted through the reverse gears 25a, 25b and hence the transmission 10 is in the reverse gear position. At this time, the clutch discs 47 serve as drive plates, whereas the clutch plates 46 as driven plates.

The force from the pressure plate 45 is larger than the force from the piston 42 by an amount commensurate with the lever ratio of the assisting member 44a. The torque transmitting capability of the reverse hydraulic clutch 40 is thus increased without increasing the hydraulic pressure in the hydraulic pressure chamber 43. A large torque transmitting requirement of the hydraulic clutch 40 can therefore be met without increasing the size of the hydraulic clutch 40. The assisting lever 44a is made of a rigid material and does not flex to an appreciable extent, so that the stroke of the piston 42 is not increased.

The retaining plate 44b of the assisting member 44 serves to hold the assisting levers 44a together. The retaining plate 44b may be made of a resilient material so as to serve as a Belleville spring for urging the piston 42 into the hydraulic pressure chamber 43. The retaining plate 44b thus constructed may be used to assist the spring force of the return spring 50, or may replace the return spring 50. As shown in FIGS. 2, 3A and 3B, the inner and outer diameters of the conical ring shaped retaining plate 44b extend to only radially intermediate portions of the assisting levers 44a where the assisting levers 44a are connected to the retaining plate 44b. In other words, each of the assisting levers 44a extends radially inwardly and outwardly beyond the retaining plate 44b.

With the arrangement of the present invention, the radially inner end of the assisting member is pushed by the piston and the radially outer end of the assisting member is borne by the clutch drum, with the intermediate region of the assisting member being disposed for pressing the pressure plate. The assisting member thus serves as a lever with the radially outer end as the fulcrum, the radially inner end receiving the applied force, and the intermediate region applying the boosted force to the pressure plate. The force applied from the piston is thus boosted by the assisting member and then transmitted to the pressure plate. The torque transmitting capability of the reverse hydraulic clutch is thus increased without increasing the hydraulic pressure in the hydraulic pressure chamber to exert a force to the piston. That is, the size of the hydraulic clutch can be reduced without lowering the capacity of the hydraulic clutch. Since the assisting member comprises a rigid member, it does not appreciably flex as compared with the conventional diaphragm spring used as a lever, the piston has a minimum stroke loss. Consequently, the axial dimension of the hydraulic clutch required to accommodate the piston stroke is reduced, making the hydraulic clutch compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic clutch construction comprising:

a clutch drum having a hydraulic pressure chamber defined therein;

a piston movably fitted in said clutch drum in covering relation to said hydraulic pressure chamber;

a pressure plate disposed in confronting relation to a surface of said piston remotely from said hydraulic pressure chamber, and having a projection;

interleaved drive and driven plates disposed in confronting relation to a surface of said pressure plate remotely from said piston, and engageable with each other by said pressure plate pressed by said piston moved in response to a hydraulic pressure supplied to said hydraulic pressure chamber; and an assisting member disposed between said piston and said pressure plate and comprising an annular array of rigid assisting levers and a retaining plate holding said assisting levers together, said assisting member having a radially inner end pressable by said piston, a radially outer end held in engagement with said clutch drum, and a radially intermediate region engageable with said projection of said pressure plate, the arrangement being such that each said assisting lever serves as a lever with said radially outer end as a fulcrum for boosting the force applied from said piston and transmitting the boosted force to said pressure plate;

each assisting lever being in force-transmitting engagement with said clutch drum at its radially outer end and being in force transmitting engagement with said piston at its radially inner end and said retaining plate being in the form of a conical 5ring of such inner and outer diameters that it extends radially to only radially intermediate portions of said assisting levers and is connected to said assisting levers in said intermediate portions;

said retaining plate being made of a resilient material so as to serve as a belleville spring for resiliently urging said assisting levers toward said piston.

2. A hydraulic clutch construction as defined in claim 1, wherein a separate return spring engages and urges said piston into said hydraulic pressure chamber.

3. A hydraulic clutch construction as defined in claim 1, wherein said the radially outer end of the assisting member is sandwiches by a support ring and s snap ring to keep the radially outer end in engagement with the clutch drum.

4. A hydraulic clutch construction comprising:
a clutch drum having a hydraulic pressure chamber defined therein;
a piston movably fitted in said clutch drum in covering relation to said hydraulic pressure chamber;
a pressure plate disposed in confronting relation to sa surface of said piston remotely from said hydraulic pressure chamber, and said pressure plate having a projection;
interleaved drive and driven plates disposed in confronting relation to a surface of said pressure plate remotely from said piston, and engageable with each other by said pressure plate pressed by said piston moved in response to a hydraulic pressure supplied to said hydraulic pressure chamber;
a return spring for urging said piston back into said hydraulic pressure chamber, and
an assisting member disposed between said piston and said pressure plate and comprising an annular array of rigid assisting levers and a retaining plate holding said assisting levers together, said assisting member having a radially inner end pressable by said piston, a radially outer end held in engagement with said clutch drum, and a radially intermediate region engagable with said projection of said pressure plate, the arrangement being such that each sid assisting lever serves as a lever with said radially outer end as a fulcrum for boosting the force applied from said piston and transmitting the boosted force to said pressure plate,
each assisting lever being in force-transmitting engagement with said clutch drum at its radially outer end and being in force transmitting engagement with said piston at its radially inner end and said retaining plate being in the form of a conical ring of such inner and outer diameters that it extends to only radially intermediate portions of the assisting levers and is connected to the assisting levers in said intermediate portions,
said retaining plate being made of a resilient material so as to serve as a Belleville spring for resiliently urging the assisting levers toward said piston.

5. A hydraulic clutch construction as defined in claim 4, wherein said the radially outer end of the assisting member is sandwiched by a support ring and a snap ring to keep the radially outer end in engagement with the clutch drum.

* * * * *